United States Patent [19]

Eichenauer et al.

[11] Patent Number: 4,912,161

[45] Date of Patent: Mar. 27, 1990

[54] THERMOPLASTIC MOULDING COMPOUNDS OF GREAT TOUGHNESS AND GOOD PROCESSABILITY IN THE MOLTEN STATE

[75] Inventors: Herbert Eichenauer; Edgar Leitz, both of Dormagen; Karl-Heinz Ott, Leverkusen; Alfred Pischtschan, Kuerten-Eichhof, all of Fed. Rep. of Germany

[73] Assignee: Bayer Aktiengesellschaft, Leverkusen, Fed. Rep. of Germany

[21] Appl. No.: 318,976

[22] Filed: Mar. 6, 1989

[30] Foreign Application Priority Data

Mar. 17, 1988 [DE] Fed. Rep. of Germany .... 3808845.2

[51] Int. Cl.$^4$ ............................................. C08L 69/00
[52] U.S. Cl. ........................................ 525/67; 525/64; 525/74; 525/186
[58] Field of Search ...................... 525/67, 64, 74, 186

[56] References Cited

U.S. PATENT DOCUMENTS 3,639,503 2/1972 Matzner ............................. 525/415
4,360,643 11/1982 Naylor ............................... 525/386

Primary Examiner—Theodore E. Pertilla
Attorney, Agent, or Firm—Connolly and Hutz

[57] ABSTRACT

Thermoplastic moulding compounds containing
(A) from 5–90 parts by weight of one or more thermoplastic polymers,
(B) from 5–90 parts by weight of one or more graft polymers and
(C) from 0.25–40 parts by weight of a blocked copolymer corresponding to the idealized formula (I)

$$A - B - A; B - A - B \text{ or } (A - B)_x \qquad (I)$$

wherein
A denotes the residue of a homopolymer, e.g. of styrene, and
B denotes the residue of a homopolymer of a cyclic carbonate or lactone.

7 Claims, No Drawings

THERMOPLASTIC MOULDING COMPOUNDS OF GREAT TOUGHNESS AND GOOD PROCESSABILITY IN THE MOLTEN STATE

ABS polymers are distinguished by their advantageous balance of properties such as toughness, dimensional stability under heat, processability and surface quality. When ABS polymers are manufactured to have special properties, e.g. exceptional toughness or high dimensional stability under heat, these desired properties can generally only be obtained at the expense of other properties.

One particular problem is the preparation of ABS products which have very high notched impact strength.

Both methods employed in practice, namely
(a) increasing the graft rubber content and
(b) increasing the molecular weight of the styrene/acrylonitrile copolymer resin matrix as well as combinations thereof result in a great increase in the melt viscosity, i.e. the thermoplastic processability is markedly impaired and surface defects occur.

It has now been found that ABS polymers which have simultaneously great toughness and excellent processibility may be obtained by the addition of a specific block copolymer.

The present invention relates to thermoplastic moulding compounds containing (A) from 5-90 parts by weight, preferably from 10-80 parts by weight and most preferably from 20-75 parts by weight, of one or more thermoplastic polymers of styrene, α-methylstyrene, styrene-substituted in the nucleus, methylmethacrylate, acrylonitrile, methacrylonitrile, maleic acid anhydride, N-substituted maleimide, vinyl acetate, and from mixtures thereof (B) from 5-90 parts by weight, preferably from 10-80 parts by weight, most preferably from 15-60 parts by weight, of one or more graft polymers of
  (B1) from 5-90 parts by weight, preferably from 30-80 parts by weight, of styrene, α-methylstyrene, styrene substituted in the nucleus, methylmethacrylate, acrylonitrile, methacrylonitrile, maleic acid anhydride, N-substituted maleimide, vinyl acetate or mixtures thereof on
  (B2) from 95-10 parts by weight, preferably from 70-20 parts by weight, of a rubber having a glass temperature of $<10°$ C., and (C) from 0.25-40 parts by weight, preferably from 0.5-30 parts by weight, of a block copolymer corresponding to the idealized formula (I)

$$A\text{-}B\text{-}A; \quad B\text{-}A\text{-}B \text{ or } (A\text{-}B)_x \qquad (I)$$

wherein
$x=1$ to 40, in particular 1 to 20 and
A stands for the residue of a homopolymer of styrene, vinylnaphthalene, butadiene or isoprene, in particular styrene or butadiene, and
B stands for the residue of a homopolymer of a cyclic carbonate or lactone corresponding to the general formulae (II) to (IV)

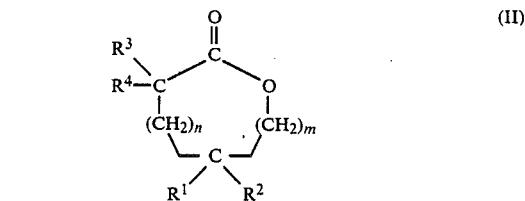

wherein
$R^1$, $R^2$, $R^3$ and $R^4=H$, $C_1$–$C_6$-alkyl, $C_3$–$C_6$-alkenyl, $C_1$–$C_6$-alkoxy or $C_1$–$C_6$-alkenoxy-$C_1$–$C_6$-alkyl, in particular H, $CH_3$ or $C_2H_5$ and
m and n denote, independently of one another, 0, 1, 2, 3, 4, 5 or 6,

wherein $R^5 = (CH_2)_n$— wherein n = 3–12, (IV)

—$CH_2CH_2CH(CH_3)$—,

—$CH_2CH_2OCH_2CH_2$—,

—$CH_2CH_2OCH_2CH_2OCH_2CH_2$—,

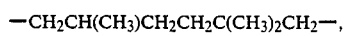
—$CH_2CH(CH_3)CH_2CH_2C(CH_3)_2CH_2$—,

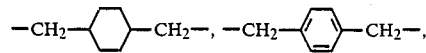

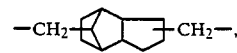

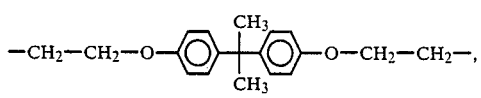

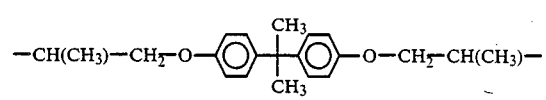

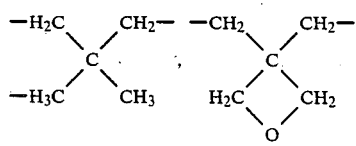

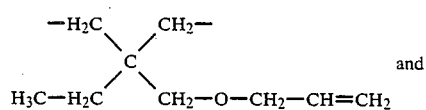

and

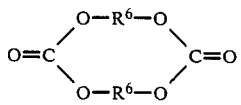

wherein $R^6 = (CH_2)_n$ wherein n = 4–12,

-continued
—CH$_2$CH$_2$OCH$_2$CH$_2$—, —CH$_2$CH$_2$OCH$_2$OCH$_2$CH$_2$—, the average molecular weight of blocks A and B being >800, preferably >1000, most preferably >10,000.

The invention further relates to moulding compounds containing from 1 to 40 parts by weight (based on 100 parts by weight of (A)+(B)+(C) of a linear aliphatic polycarbonate as component (D) in addition to components (A)+(B)+(C).

The mixtures according to the invention of copolymer, graft polymer, block copolymer and optionally linear aliphatic polycarbonate may contain conventional additives such as flame retardants, stabilizers, mould release agents, lubricants, antistatic agents and fillers in the usual quantities.

The addition of block copolymer (C) results in moulding compounds of the ABS type which have not only great toughness but also improved flowability and therefore improved processibility. This means that even injection moulded parts of large dimensions or with a complicated shape, such as computer housings or automobile parts can be produced more easily and at lower temperatures owing to their improved flowability.

Thermoplastic polymers (A) according to the invention include those obtained from styrene, α-methylstyrene, p-methylstyrene, vinyl toluene, halogenated styrene, methylacrylate, methylmethacrylate, acrylonitrile, methacrylonitrile, maleic acid anhydride, N-substituted maleimide, and mixtures thereof.

The thermoplastic polymers (A) are resinous and free from rubber. Particularly preferred polymers A include those obtained from styrene, methylmethacrylate, styrene/acrylonitrile mixtures, styrene/acrylonitrile/methylmethacrylate mixtures, styrene/methylmethacrylate mixtures, acrylonitrile/methylmethacrylate mixtures α-metylstyrene/acrylonitrile mixtures, styrene/α-methylstyrene/acrylonitrile mixtures, α-methylstyrene/methylmethacrylate/acrylonitrile mixtures, styrene/α-methylstyrene/methyl methyacrylate mixtures, styrene/α-methylstyrene/methylmethacrylate/acrylonitrile mixtures, styrene/maleic acid anhydride mixtures and styrene/methylmethacrylate/maleic acid anhydride mixtures.

The thermoplastic polymers A are known and may be obtained by radical polymerization, in particular by emulsion, suspension, solution or solvent-free polymerization. They preferably have molecular weights $\overline{M}_w$ of from 20,000 to 200,000 and limiting viscosities [η] of from 20 to 100 ml/g (determined in dimethylformamide at 25° C.).

Rubbers suitable as grafting base for the preparation of the graft polymers used as component (B) include in particular polybutadiene, butadiene/styrene copolymers, butadiene/acrylonitrile copolymers, polyisoprene, EPM rubbers (ethylene/propylene rubbers), EPDM rubbers (ethylene/propylene/diene rubbers containing, as diene, small quantities of a non-conjugated diene such as hexadiene-(1,5) or norbornadiene) and alkylacrylate rubbers based on C$_1$–C$_8$-alkylacrylates, in particular on ethyl, butyl and ethylhexylacrylate The alkylacrylate rubbers may contain up to 30% by weight (based on the weight of rubber) of monomers such as vinyl acetate, acrylonitrile, styrene, methyl methacrylate and/or vinyl ether in a copolymerised form. They may contain minor quantities, preferably up to 5% by weight (based on the weight of rubber) of ethylenically unsaturated monomers which have a cross-linking action. Examples of such cross-linking agents include alkylenediol-di-acrylates, and methacrylates, polyester-di-acrylates and methacrylates, divinylbenzene trivinylbenzene, triallylcyanurate, allylacrylate allylmethacrylate, butadiene and isoprene. The acrylate rubbers may also be core/shell rubber containing, as core, a cross-linked diene rubbers of one or more conjugated dienes such as polybutadiene or a copolymer of a conjugated diene with an ethylenically unsaturated monomer such as styrene and/or acrylonitrile.

Diene rubbers and alkylacrylate rubbers are preferred rubbers for the preparation of the graft polymers (B).

The rubbers are present in graft polymer (B) in the form of at least partially cross-linked particles having an average particle diameter of from 0.05 to 20.0 μm, preferably from 0.1 to 2.0 μm, most preferably from 0.1 to 0.8 μm. The particle diameter is defined in this context to denote the average particle diameter d$_{50}$ determined by ultracentrifuge measurements according to W. Scholtan et al., Kolloid-Z. u Z. Polymere 250 (1972), 782–796.

The graft polymers B are prepared by radical graft polymerization of monomers (B.1) in the presence of rubbers (B.2) which are to be grafted. The preferred method of preparation of graft polymers (B) are emulsion, solution, solvent-free and suspension polymerization and combinations of these processes carried out in known manner. ABS polymers are particularly preferred graft polymers (B).

The block copolymers (C) are compounds corresponding to the idealized formulae (I)

A-B-A; B-A-B or (A-B)$_x$     (I)

wherein x=1 to 40, in particular 1 to 20 and

A denotes the residue of a homopolymer of styrene, vinyl naphthalene, butadiene or isoprene, in particular styrene or butadiene, and B denotes the residue of a homopolymer of a cyclic carbonate or lactone corresponding to the general formulae (II) to (IV):

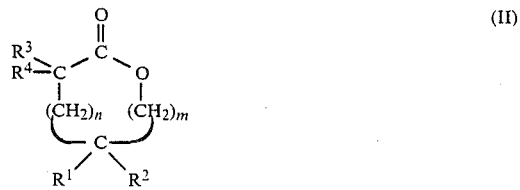
(II)

wherein

R$^1$, R$^2$, R$^3$ and R$^4$=H, C$_1$–C$_6$-alkyl, C$_3$–C$_6$-alkenyl, C$_1$–C$_6$-alkoxy or C$_1$–C$_6$-alkenoxy-C$_1$–C$_6$-alkyl, in particular H, CH$_3$ or C$_2$H$_5$ and m and n denote, independently of one another, 0, 1, 2, 3, 4, 5 or 6,

(III)

wherein $R^5 = (CH_2)_n$ wherein n = 3–12,  (IV)

—CH₂CH₂CH(CH₃)—,

—CH₂CH₂OCH₂CH₂—,

—CH₂CH₂OCH₂CH₂OCH₂—CH₂,

—CH₂CH(CH₃)CH₂CH₂C(CH₃)₂CH₂—,

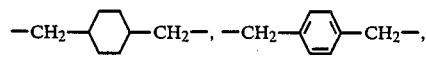

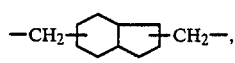

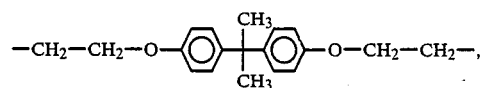

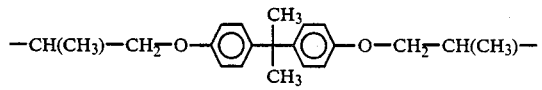

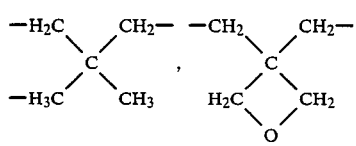

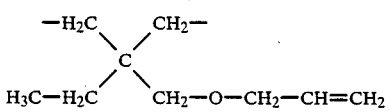

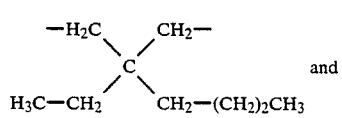

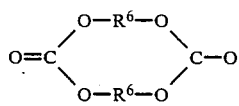

wherein $R^6 = (CH_2)_n$ wherein n = 4–12,

—CH₂CH₂OCH₂CH₂—,

—CH₂CH₂OCH₂OCH₂CH₂—, the average molecular weight of blocks A and B being >800, preferably >1000, most preferably >10,000.

Preferred cyclic carbonates (III) and (IV) include trimethylene glycol carbonate, neopentylglycol carbonate, 1,4-butanediol carbonate and dimeric carbonates of pentanediol or of hexanediol, Neopentylglycol carbonate is particularly preferred. ε-Caprolactone and pivalolactone are preferred lactones (II).

The block copolymers contain blocks A and B in quantities of from 5 to 95% by weight (based on the total quantity of A+B), preferably in quantities of from 5 to 50% by weight of A and from 95 to 50% by weight of B or from 5 to 50% by weight of B and from 95 to 50% by weight of A.

The block copolymers may be prepared by anionic polymerization in known manner, multistage anionic polymerization at low temperatures in dilute solution according to DE-OS 37 07 627 being particularly preferred.

Preferred block copolymers (C) to be put into the process are the products with molecular weights $\overline{M}_w$ in the range of from 2000 to 500,000, preferably from 5000 to 400,000, obtained according to DE-OS 36 07 627.

Suitable linear aliphatic polycarbonates used as component (D) include compounds corresponding to the general formula (V)

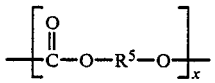
(V)

wherein $R^5$ denotes the residues defined above and x denotes an integer corresponding to a molecular weight of from 2000 to 500,000.

Polyneopentylglycol carbonate (VI)

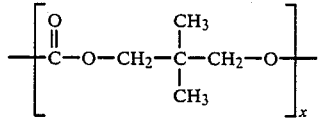
(VI)

is a preferred aliphatic polycarbonate (D).

The aliphatic polycarbonates (D) may be prepared by conventional methods, e.g. by tranesterification or phosgenation of diols (DE-OS 20 01 091, FR-PS 13 91 512, DE-OS 10 31 512, DE-OS 24 46 107, DE-OS 26 05 024, EP 002 641 and DE-OS 24 47 349) but are preferably prepared by ring opening solvent-free or solution polymerisation of cyclic aliphatic carbonates (DE-OS 15 45 116, 15 45 117, 31 03 135 and 32 04 078).

The preferred method of preparation is the anionic ring opening solution polymerization of cyclic aliphatic carbonates at low temperatures according to DE-OS 36 07 625.

Cyclic aliphatic carbonates for the preparation of the aliphatic polycarbonate component in the moulding compounds according to the invention are compounds corresponding to formula (III) and/or (IV):

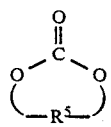
(III)

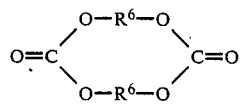
(IV)

wherein
$R^5$ und $R^6$ denote the residue indicated above.

It is preferred to use carbonates corresponding to formula (III) and the carbonate wherein

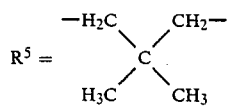

is particularly preferred.

Preferred aliphatic polycarbonates (D) include the products with molecular weights $\overline{M}_w$ in the range of from 2000 to 500,000, preferably from 15,000 to 350,000, obtained according to DE-OS 36 07 625.

The mixtures according to the invention containing components (A), (B) and (C), optionally (D) and optionally conventional additives such as flame retardants, lubricants, stabilizers, pigments, mould release agents, antistatic agents or fillers are prepared by mixing the components in known manner, either simultaneously or successively, at room temperature or at elevated temperature and then melt compounding or melt extruding the resulting mixture at temperatures of from 150° C. to 300° C. in conventional apparatus such as internal kneaders, extruders or double shaft screws.

The moulding compounds according to the present invention may be used for the production of moulded articles of all types, for which conventional methods of production may be employed, in particular injection moulding.

Another method of processing the moulding compounds according to the invention is the production of moulded articles by deep drawing plates or sheets previously produced by known process.

EXAMPLES

Thermoplastic Polymer-A

Statistic styrene/acrylonitrile=72:28-copolymer having a $\overline{M}_w$ of about 115,000 and a non-uniformity $\overline{M}_w/\overline{M}_n - 1 \leq 2.0$.

Graft polymer-B

Graft product obtained by emulsion polymerization of 50% by weight of a styrene/acrylonitrile mixture (ratio by weight 72:28) on 50% weight of particulate polybutadiene having an average particle diameter ($d_{50}$) of 0.4 μm.

Block copolymer-C

C 1: Block copolymer of the type A-B wherein A stands for polystyrene and B for polyneopentyl glycol carbonate. The block copolymer was obtained by anionic polymerisation according to DE-OS 36 07 627. The ratio by weight of the monomers styrene and neopentyl glycol carbonate is 20:80 and the relative solution viscosity $\eta_{rel}$ of the polymer is 2.81 (2% by weight solution in $CH_2Cl_2$ at 20° C.).

C 2: Block copolymer of the type A-B wherein A stands for polyisoprene and B for polyneopentyl glycol carbonate. The method of preparation is according to DE-OS 36 07 627. The ratio by weight of monomers isoprene and neopentyl glycol carbonate is 20:80 and the relative solution viscosity $\eta_{rel}$ of the polymer is (2.28% by weight solution in $CH_2Cl_2$ at 20° C.).

C 3: Block copolymer of the type A-B wherein A stands for polystyrene and B for a copolymer of neopentyl glycol carbonate and ε-caprolactone. Preparation by the process according to DE-OS 36 07 627. The ratio by weight of the monomers styrene, neopentyl glycol carbonate and ε-caprolactone is 20:70:10 and the relative solution viscosity $n_{rel}$ of the polymer ist 2.18 (2% by weight solution in $CH_2Cl_2$ at 20° C.).

Aliphatic Polycarbonate-D

Aliphatic polycarbonate based on neopentyl glycol (2,2-dimethylpropanediol) obtained by ring opening anionic polymerisation of a neopentyl glycol carbonate having a relative solution viscosity $\eta_{rel}$ of 3.17 (2% by weight solution in $CH_2Cl_2$ at 20° C.).

Compounding of components (A), (B) and (C) and optionally (D) together with 0.1 part by weight of a silicone oil was carried out on a 1.3 l internal kneader at temperatures of from 160° to 200° C.

The moulded articles were produced in an injection moulding machine at 240° C.

The notched impact strength ($a_k$) was determined according to DIN 453 (unit: $kJ/m^2$) at room temperature. The processability was determined by measuring the volume-flow index MVI according to DIN 735 U (Unit: $cm^3/10$ min) and the filling pressure required (see F. Johannaber, Kunststoffe 74 (1984), 1, pages 2–5).

The compositions of moulding compounds investigated and the test data obtained are summarized in Table 1. Compared with comparison experiments, the compositions according to the invention have lower values for filling pressure and higher MVI values and markedly higher levels of toughness.

TABLE 1

| | Compositions and test data of the moulding compounds | | | | | | | | |
|---|---|---|---|---|---|---|---|---|---|
| Example No. | A Parts by wt. | B Parts by wt. | C 1 Parts by wt. | C 2 Parts by wt. | C 3 Parts by wt. | D Parts by wt. | $a_k$ $kJ/m^2$ | MVI | Filling pressure (240° C.) bar |
| 1. | 50 | 40 | 10 | — | — | — | 26 | 6.3 | 344 |
| 2. | 40 | 40 | 20 | — | — | — | 25 | 9.5 | 327 |
| 3. | 50 | 40 | — | 10 | — | — | 25 | 6.4 | 342 |
| 4. | 40 | 40 | — | 20 | — | — | 30 | 11.6 | 315 |
| 5. | 50 | 40 | — | — | 10 | — | 25 | 8.0 | 329 |
| 6. | 40 | 40 | — | — | 20 | — | 25 | 16.0 | 287 |
| 7. | 40 | 30 | 20 | — | — | 10 | 24 | 14.5 | 299 |
| 8. | 30 | 40 | — | — | 20 | 10 | 26 | 13.8 | 305 |
| 9. (Comparison) | 60 | 40 | — | — | — | — | 17 | 7.2 | 375 |

We claim:

1. Thermoplastic moulding compositions comprising
   (A) from 5–90 parts by weight of one or more thermoplastic polymers of styrene, α-methylstyrene, styrene substituted in the nucleus, methyl methacrylate, acrylonitrile, methacrylonitrile, maleic acid anhydride, N-substituted maleimide, vinyl acetate, and mixtures thereof
   (B) from 5–90 parts by weight of one or more graft polymers of
      (B1) from 5–90 parts by weight of styrene, α-methylstyrene, styrene substituted in the nucleus, methylmethacrylate, acrylonitrile, methacrylonitrile, maleic acid anhydride, N-substituted maleimide, vinyl acetate or mixtures thereof on
      (B2) from 95–10 parts by weight of a rubber having a glass temperature $\leq 10°$ C. and (C) from 0.25–40 parts by weight of a block copolymer corresponding to the idealized formula (I)

A-B-A; B-A-B or (A-B)$_x$     (I)

wherein
x=1 to 40 and
A denotes the residue of a homopolymer of styrene, vinyl naphthalene, butadiene or isoprene, and
B denotes the residue of a homopolymer of a cyclic carbonate or lactone corresponding to the general formulae (II) to (IV):

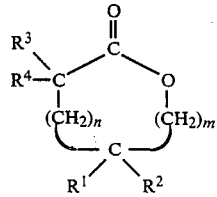
(II)

wherein
$R^1$, $R^2$, $R^3$ and $R^4$=H, $C_1$–$C_6$-alkyl, $C_3$–$C_6$-alkenyl, $C_1$–$C_6$-alkoxy or $C_1$–$C_6$-alkenoxy-$C_1$–$C_6$-alkyl, and
m and n denote, independently of one another, 0, 1, 2, 3, 4, 5 or 6,

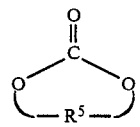
(III)

wherein $R^5$ = (CH$_2$)$_n$ wherein n = 3–12, —CH$_2$CH$_2$CH(CH$_3$)—,

—CH$_2$CH$_2$OCH$_2$CH$_2$—, —CH$_2$CH$_2$OCH$_2$CH$_2$—OCH$_2$—CH$_2$—,

—CH$_2$CH(CH$_3$)CH$_2$CH$_2$C(CH$_3$)$_2$CH$_2$—,

—CH$_2$—⟨cyclohexyl⟩—CH$_2$—, —CH$_2$—⟨cyclohexyl⟩—CH$_2$—,

—CH$_2$—⟨bicyclic⟩—CH$_2$—,

—CH$_2$—CH$_2$—O—⟨C(CH$_3$)$_2$ bisphenol⟩—O—CH$_2$—CH$_2$—,

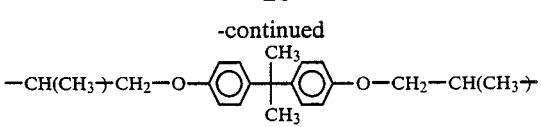

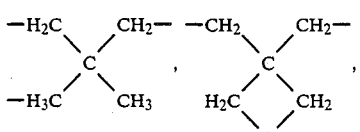

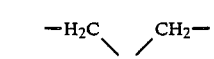

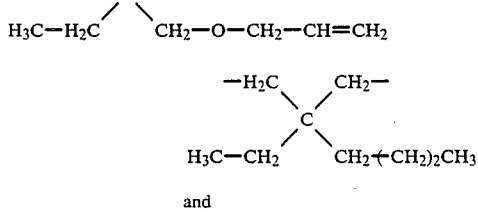

and

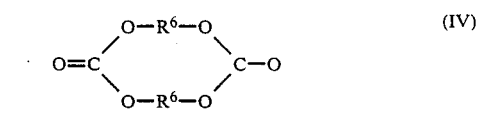
(IV)

wherein $R^6$ = (CH$_2$)$_n$ wherein n = 4–12,

—CH$_2$CH$_2$OCH$_2$CH$_2$—, —CH$_2$CH$_2$OCH$_2$OCH$_2$CH$_2$—, the average molecular weights of blocks A and B being ≧800.

2. Moulding compositions according to claim 1, containing in addition to components (A)+(B)+(C), from 1 to 40 parts by weight (based on 100 parts by weight of (A)+(B)+(C) of a linear aliphatic polycarbonate (D).

3. Moulding compositions according to claim 1 containing as (C) a polymer prepared by anionic polymerization.

4. Moulding compositions according to claim 2 containing as (D) a polymer prepared by anionic ring opening polymerization.

5. Moulding compositions according to claim 1 containing as (C) a copolymer of from 5 to 95% by weight of styrene and from 95 to 5% by weight of neopentyl glycol carbonate.

6. Moulding compositions according to claim 2 containing as (D) polyneopentyl glycol carbonate.

7. Moulding compositions according to claim 1 wherein A denotes styrene or butadiene and $R^1$, $R^2$, $R^3$ and $R^4$=H, CH$_3$ or C$_2$H$_5$.

* * * * *